United States Patent [19]
Creamer et al.

[11] Patent Number: 5,982,865
[45] Date of Patent: Nov. 9, 1999

[54] FLEXIBLE CUSTOMER BILLING SOLUTION FOR TELEPHONE SYSTEMS UTILIZING INTELLIGENT PERIPHERALS IN ADVANCED INTELLIGENT NETWORK

[75] Inventors: Thomas Edward Creamer; Shailesh Gandhi; Peeyush Jaiswal, all of Boca Raton; Pradeep Parsram Mansey, Coral Springs, all of Fla.; Joan Micheals, Little Silver, N.J.

[73] Assignee: International Business Machines Corporation, Armonk, N.Y.

[21] Appl. No.: 08/979,041

[22] Filed: Nov. 26, 1997

[51] Int. Cl.$^6$ .................................................. H04M 15/00
[52] U.S. Cl. .......................... 379/116; 379/119; 379/230
[58] Field of Search ..................... 379/112, 114, 379/115, 116, 119, 120, 121, 133, 134, 207, 230

[56] References Cited

U.S. PATENT DOCUMENTS

| | | | |
|---|---|---|---|
| 5,511,113 | 4/1996 | Tasaki et al. | 379/112 |
| 5,517,560 | 5/1996 | Greenspan | 379/114 |
| 5,793,853 | 8/1998 | Sbisa | 379/115 |

OTHER PUBLICATIONS

Peeyush Jaiswal et al.–US Serial No. 08/978,184–"Billing Formatter for Telephone Systems Which Include Intelligtent Peripherals in Advanced Intelligent Network".

Deborah Acker et al.–US Serial No. 08/792,018–"Multi Service Platform Architecture for Telephone Networks".

*Primary Examiner*—Paul Loomis
*Attorney, Agent, or Firm*—Gunster, Yoakley, Valdes-Fauli & Stewart, P.A.; John A. Gibbons; Michael J. Buchenhorner

[57] ABSTRACT

A billing system and method is disclosed for a telephone system comprising at least one central office switching system, wherein a peripheral subsystem is connected to the central office switching systems via a call connection channel, the peripheral subsystem comprising means for providing at least one auxiliary call processing capability via the call connection channel. The a billing system comprises: a billing generation means running on said peripheral subsystem for generating billing data related to said auxiliary call processing capability; a collecting means for collecting said billing data; formatting said billing data to a specified formatted output and outputting said formatted output to said central office communication network.

12 Claims, 6 Drawing Sheets

|  | INFORMATION | TABLE NUMBER | NUMBER OF CHARACTERS |
|---|---|---|---|
| HEADER | RECORD DESCRIPTOR WORD | '000 | 4 |
| HEADER | HEX ID | '00 | 2 |
| HEADER | STRUCTURE CODE | 0 | 6 |
| HEADER | CALL TYPE | 1 | 4 |
| HEADER | SENSOR TYPE | 2 | 4 |
| HEADER | SENSOR ID | 3 | 8 |
| HEADER | RECORDING OFFICE TYPE | 4 | 4 |
| HEADER | RECORDING OFFICE ID | 5 | 8 |
| MANDATORY | DATE OF TRANSACTION | 6 | 6 |
| ELEMENT | TIMING INDICATOR | 7 | 6 |
| ELEMENT | STUDY INDICATOR | 8 | 8 |
| MANDATORY | CONNECT TIME | 18 | 8 |
| MANDATORY | ELAPSED TIME | 19 | 10 |
| MANDATORY | SERVICE LOGIC ID | 77 | 10 |
| ELEMENT | COMPLETION INDICATOR | 280 | 4 |
| MANDATORY | SUBSCRIBER ID | 25 | 12 |
| ELEMENT | SIGNIFICANT DIGITS | 55 | 4 |

*FIG. 4*

|  | INFORMATION | TABLE NUMBER | NUMBER OF CHARACTERS |
|---|---|---|---|
| HEADER | MODULE CODE | 88 | 4 |
| MANDATORY | ORIGINATING NPA | 13 | 4 |
| MANDATORY | ORIGINATING NUMBER | 14 | 8 |
| ELEMENT | OVERSEAS NPA DIALING INDICATOR | 15 | 2 |
| MANDATORY | TERMINATING NPA | 16 | 6 |
| MANDATORY | TERMINATING NUMBER | 17 | 8 |
| ELEMENT | COMPLETION INDICATOR | 280 | 4 |
| MANDATORY | RATE/SERVICE INDICATOR | 540 | 4 |
| ELEMENT | RATE CENTER NPA-NXX | 81 | 8 |
| MANDATORY | CONNECT TIME | 18 | 8 |
| MANDATORY | ELAPSED TIME | 19 | 10 |
| ELEMENT | IC/INC IDENTIFICATION | 57 | 6 |
| ELEMENT | TRANSACTION CODE/BOC SETTABLE | 541 | 16 |
|  | TOTAL |  | 92 |

*FIG. 5*

|  | INFORMATION | TABLE NUMBER | NUMBER OF CHARACTERS |
|---|---|---|---|
| HEADER | MODULE CODE | 88 | 4 |
| HEADER | BILLING TYPE ID | 117 | 2 |
| ELEMENT | FORMAT IDENTIFIER | 400 | 2 |
| ELEMENT | SIGNIFICANT DIGITS NF | 55 | 4 |
| ELEMENT | ALTERNATE BILLING-DIGITS 1 | 401 | 12 |
| ELEMENT | ALTERNATE BILLING-DIGITS 2 | 402 | 10 |
| ELEMENT | RAO NUMBER | 46 | 4 |
| ELEMENT | CALLING CARD SUBACCOUNT | 289 | 4 |
| ELEMENT | TREATMENT INDICATOR | 277 | 2 |
| ELEMENT | LIDB RESPONSE | 286 | 4 |
| ELEMENT | OPERATOR SERVICES SYSTEM ACTION | 291 | 2 |
| ELEMENT | METHOD OF INPUT/RESPONSE | 290 | 4 |
| ELEMENT | SEQUENCE CALL COUNTER | 802 | 4 |
|  | TOTAL |  | 58 |

*FIG. 6*

|  | INFORMATION | TABLE NUMBER | NUMBER OF CHARACTERS |
|---|---|---|---|
| HEADER | MODULE CODE | 88 | 4 |
| MANDATORY | SERVICE TYPE | 606 | 6 |
| MANDATORY | CONNECT TIME | 18 | 8 |
| MANDATORY | ELAPSED TIME | 19 | 10 |
| ELEMENT | OPTIONAL FIELD 1 | 541 | 16 |
| ELEMENT | OPTIONAL FIELD 2 | 541 | 16 |
|  | TOTAL |  | 60 |

*FIG. 7*

FLEXIBLE CUSTOMER BILLING SOLUTION FOR TELEPHONE SYSTEMS UTILIZING INTELLIGENT PERIPHERALS IN ADVANCED INTELLIGENT NETWORK

FIELD OF THE INVENTION

The present invention relates generally to telephone systems, and in particular, to telephone billing systems for central office switches adapted to provide advanced intelligent network (AIN) operations and services.

BACKGROUND OF THE INVENTION

Over the past few years, the number of new services and features offered over enhanced telephone networks has grown. These enhanced telephone networks are known as "Advanced Intelligent Networks" (AINs). Telephony control networks conforming to AIN architecture contain intelligent subsystems for controlling switched traffic and user services such as call waiting, call forwarding, voice announcements, voice response, keyboard response, etc.. These intelligent subsystems, called "intelligent peripherals" (IP), are configured for specific regional calling services.

Multi-processor systems used as an AIN system are disclosed in the patent application Ser. No. 08/792,018 by Deborah L. Acker and Thomas E. Creamer and assigned to International Business Machines (IBM) and is incorporated herein by reference.

The customer billing for these enhanced AIN services has typically been implemented on Service Control Points (SCP) connected to a Signal Switching Point (SSP). The billing was not performed on a basis of usage of the services provided but on a flat, typically monthly, rate. Flat billing methods lacked the details required by telephone customers. Details requested by customers during a billing period include the frequency of a specific service used and the period of time a particular service was employed. With the increase use of intelligent peripherals in AIN a need exists for a flexible usage-based customer billing and account system with detailed call and detail services. Moreover, a need exists to eliminate the requirement of an SCP for telephony billing services on an IP.

SUMMARY OF THE INVENTION

Briefly in accordance with the present invention, a billing system and method is disclosed for a telephone system comprises at least one central office switching system, wherein a peripheral subsystem is connected to the central office switching systems via a call connection channel, the peripheral subsystem comprises means for providing at least one auxiliary call processing capability via the call connection channel. The a billing system comprises: a billing generation means running on said peripheral subsystem for generating billing data related to said auxiliary call processing capability; a collecting means for collecting said billing data; formatting said billing data to a specified formatted output and outputting said formatted output to said central office communication network.

BRIEF DESCRIPTION OF THE DRAWING(S)

FIG. 4 is an example format process output for Bellcore AMA Format (BAF) billing system structure #116.

FIG. 5 is an example format process output for Bellcore AMA Format (BAF) billing system structure #117.

FIG. 6 is an example format process output for Bellcore AMA Format (BAF) billing system structure #052.

FIG. 7 is an example format process output for Bellcore AMA Format (BAF) billing system structure #118.

DESCRIPTION OF A PREFERRED EMBODIMENT

Figure 1:
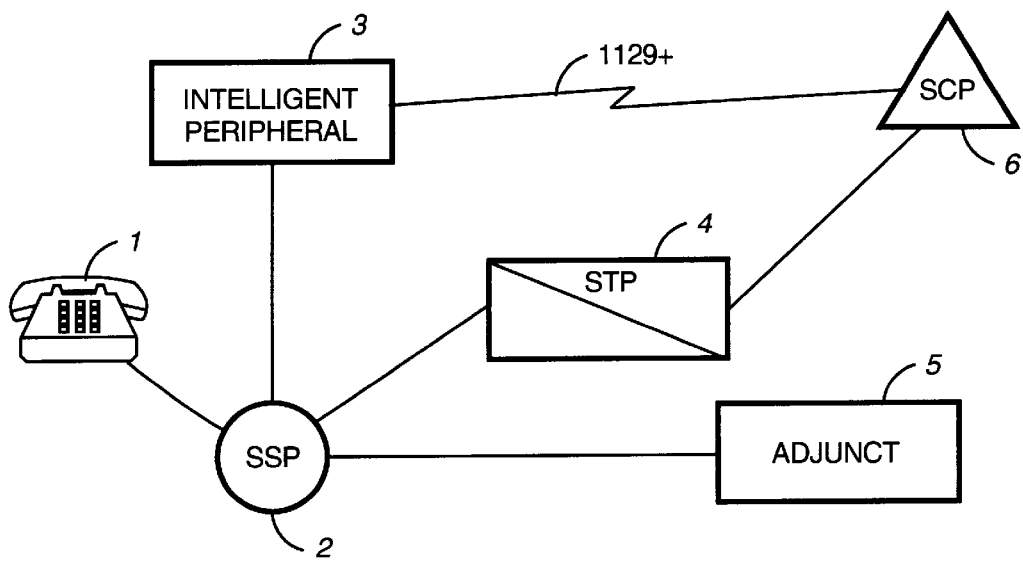
FIG. 1 is a functional block diagram of a telephone network conforming to AIN architecture.

FIG. 1 illustrates a network conforming to public switched telephone network ("PSTN") architectures for advanced intelligent network ("AIN"). Further information about AIN architecture can be obtained by referring to one or more of the following published documents, whose teachings are incorporated herein by reference.

Bellcore, GR-2802-CORE, Advanced intelligent Network (AIN) 0.X Issue 1, Generic Requirements, Issue 2, December 1993.

Bellcore, GR-1129-CORE, Advanced Intelligent Network (AIN) 0.2 switch Intelligent Peripheral Interface (IPI) Generic Requirements, ILC 1E, November 1994.

ISC-IP Interface Specification, Bellcore, SR-3511.

An AIN system is associated with a regional node of the PSTN. Telephone unit 1, available to a "local" PSTN user, links to the regional node through a signal switch points (SSP) complex 2. SSP 2 connects to an intelligent peripheral (IP) system 3, a hierarchical network of signaling transfer points (STPs) 4, and an adjunct system 5.

IP 3 provides switched connections for telephone calls passing through the respective regional node (e.g., between local and trunk lines traversing the node), and controls service applications associated with respective calls (conferencing, voice announcements, speech recognition applications, call forwarding, etc.). SSP 2 supports communications between telephones such as unit 1 and IP 3 using ISDN (Integrated Services Digital Network) connections.

SSP 2 communicates through the STPs with a service control point (SCP) 6, using a known signaling system and SS7 packet-switched message format. The IP 3 and SCP 6 coordinate service logic functions (e.g. functions required to play voice announcements) using a known "1129+" signaling protocol.

Call connections between local telephones such as unit 1 and other local telephones are formed by operations of IP 3 and SSP2. Connections between local telephone 1 and remote telephones associated with remote SSPs and IPs are formed by transmission of call setup messages between SSP2 and the remote SSPs via STP 4 (and other STPs if appropriate) as well as SCP 6 (and remote SCPs if appropriate). Upon determining that a path exists for a required remote call connection, SSP 2 and the other SSPs cooperate with respective IPs to establish the connection.

Message communications, between SSP's such as SSP 2 and both respective IPs such as IP 3 and associated SCPs such as SCP 6, are required to set up call connections and administer telephone user services associated with respective calls. Such message communications are conducted through a common channel signaling (CCS) network formed between the SSPs, the STPs, and the SCPs using the aforementioned SS7 packet switched signaling protocol. The SS7 protocol is used as a network transport layer to facilitate message communication within the CCS network. A regional CCS network, encompassing a region containing the local switching office nearest to the telephone 1 and other switching offices, contains a hierarchy of STPs associated with a hierarchy of SCPs. Each SSP, at local levels nearest to individual user telephones such as 1, connects to two SSPs associated with the respective level. This redundancy is useful to produce high reliability.

Message communications between IPs such as 3 and SCPs such as 6 are conducted in the previously mentioned "1129+" signaling protocol. That protocol enables service logic running on the SCPs to coordinate actions with service logic running on the IPs during delivery of telephone services to telephones such as 1.

Operations of elements 2–6 enable an authorized user of telephone 1 (e.g. the owner of the telephone or an authorized representative of the owner) to administer services to which the owner of the telephone has subscribed (both conventional services, such as call waiting and call forwarding, and new services yet to be defined) without required assistance of operators or other human representatives of the telephone company that interfaces to the telephone.

SSPs are program-controlled telephone switching systems (either access tandem switches or end officers) without local networks connecting to user telephones in a local subregion. They form local interfaces to the aforementioned CCS network.

SCPs are stand-alone network systems which, in existing intelligent telephony control networks, have been primary focal points for administration of services provided to PSTN users. An SCP can contain service logic and online, real-time database systems. An SCP provides call processing information and instructions in response to queries received through the CCS network.

SCPs support multiple applications, each containing logic defining the handling of individuals calls. After determining actions to be performed in response to a specific query, the SCP sends instructions for handling the respective call back to the SSP that initiated the inquiry. Different services/applications may be offered at different SCPs.

Adjuncts 5 are also stand-alone network systems. They are functionally equivalent to SCPs, but each communicates directly with only one locally associated SSP (whereas SCPs can communicate with multiple SSPs, both within and external to a local region or sub-region). In operation, such adjunct networks enable the development and delivery of telephony services which are not totally reliant on SSPs and SCPs for implementation.

The billing system solution is described in detail in patent application BC9-97-036 by Thomas E. Creamer, Shailesh Gandhi, Peeyush Jaiswal, Pradeep Mansey, and Joan Micheals, for "Flexible Customer Billing Solution For Telephone Systems utilizing Intelligent Peripherals In Advanced Intelligent Network" assigned to International Business Machines (IBM) and is incorporated herein by reference.

Figure 2:
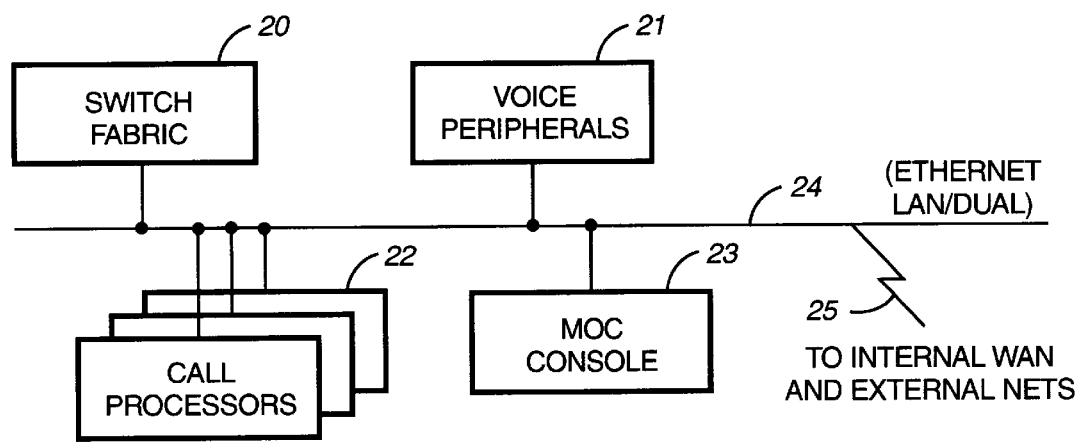
FIG. 2 is a block diagram of the hardware architecture of an intelligent peripheral (IP) system for the network of FIG. 1.

FIG. 2 shows the principal components of the IP system 3 of FIG. 1. IP system 3 is 3 based upon an IBM MSP/6000 system. Standard elements of an MSP/6000 system include a "switch fabric" complex 20, voice peripherals 21, call processors 22, a maintenance and operations console (MOC) processor 23 are all attached via communications link 24. Critical components including voice peripheral processors 21 and call processors 22 are configured redundantly to ensure continuous availability in case of any component failure. Further information on the IBM MSP/6000 system can be found in the patent application entitled "Multi-processor systems used as an AIN system" application Ser. No. 08/792,018 by Deborah L. Acker and Thomas E. Creamer and assigned to International Business Machines (IBM) and is incorporated herein by reference.

Figure 3A:
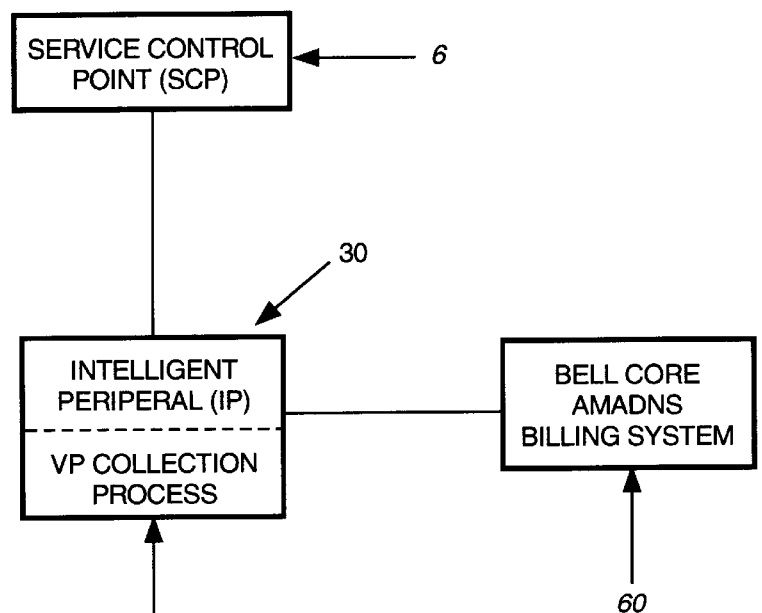
FIG. 3 is a block diagram of the billing process flow according to the present invention.
Figure 3B:
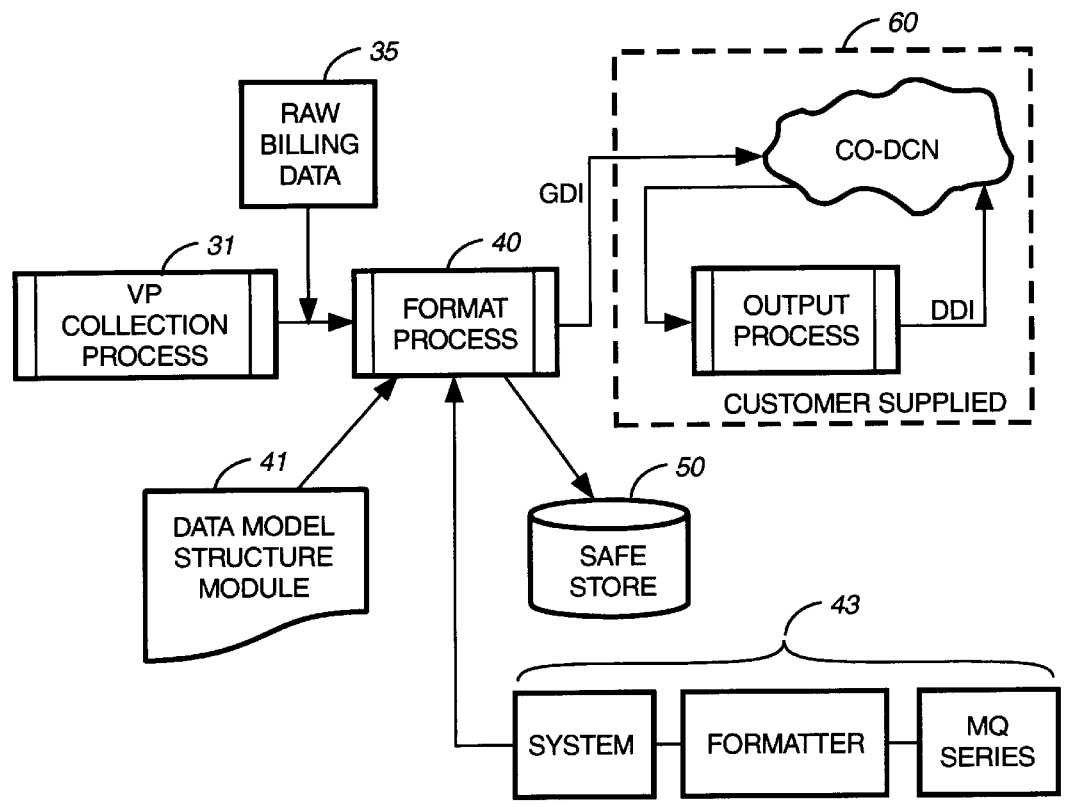

Customize telephony services running on MSP/6000 include detailed billing, call forwarding, call waiting, voice announcements, voice response, keyboard response, debit card call, detailed billing, peak/off peak charges etc.. FIG. 3 is a block diagram of the billing function flow for an IP according to the present invention. As previously mentioned, the service logic running on SCP 6 coordinates and communicates with the service logic running on IP 30. Billing for the IP service is collected and formatted by voice peripheral collection process 31 and then sent to Bellcore AMADNS Billing system 60. The billing functions for the MSP/6000 can be broken down into three distinct subsystems (1) collection-generation subsystem (2) formatting subsystem and (3) output subsystem. Each of these three subsystems will now be described.

Referring now to FIG. 4, the collection-generation subsystem 31 is an IBM RS/6000 using a set of custom Application Programming Interfaces (APIs).

When the billing is initiated for a particular service, the collection system receives the ID of the service provided, the telephone numbers of the service dialed and the originating line number. The APIs sequence consists of opening the billing sequence, populating the billing elements with appropriate billing information such as:

date of the transaction (month, date, year)
connect time of the transaction
disconnect time of the transaction
originating number
terminating number
type of service
billing type ID
etc.

The APIs provide the appropriate billing data on a per service per subscriber basis. Using an API approach supports the flexibility required for specialized telephony services. Billing can be designed on a time-sensitive, such as, call completion or per usage basis. For a complete detailed description of the APIs refer to MSP/6000 Release 1.1 Billing Design API Description. APIs defined in this API reference include:

ApiBillingOpen—which cause the Collection-generation subsystem to open a billing record;
ApiBillingElements—causes the Collection-generation subsystem to collecting billing information for service;
ApiBillingGroupOpen—notifies a collection process running on Collection-generation subsystem that a billing module will be needed;
ApiBillingGroupClose—closing the billing record for the subscriber-service provided; and
ApiBillingTimeToString—allows services to merge time values from two distinct fields into one field (e.g. merge two fields—seconds and milliseconds—into one data field milliseconds).

Once the billing elements are populated, an API closes the collection process and the raw billing data is forwarded via TCP/IP to a format process 40 of FIG. 3.

The formatting subsystem is described in detail in patent application BC9-97-036 by Peeyush Jaiswal, Shailesh Gandhi and Vanessa Michelini for "Billing Formatter for Telephone Systems Utilizing Intelligent Peripherals in Advanced Intelligent Network" assigned to International Business Machines (IBM) and is incorporated herein by reference. Referring to FIG. 3, Raw billing data 35 is outputted from collection process 31 running on collection-generation subsystem to format process 40. Format process 40 is composed of an IBM RISC System 6000 and contains software programs that receive the raw data from collection process 31 and associates it with a specific billing formatter data structure 41. A set of configuration files 43 separated into three groups—formatter configuration file, system configuration file, MQSeries configuration file—is shown. By editing the configuration files 43, the characteristics of the format process 40 can be changed without the need to modify the format software programs running on format process 40.

The output subsystem sends the output of the format process to a customer supplied billing system 60 in the specified billing system format. A typical billing format is the Bellcore AMA Format (BAF) using AMADNS protocol (GR-1343-CORE, Issue 1, Rev. 1 December 1995). Example BAF formats are shown in FIGS. 5–8.

In another embodiment, the format processor 40 in FIG. 4 beside sending the formatted output buffer to the customer supplied billing system, the output buffer is written to a safe storage system 50 as well. The storage system will keep the formatted output for a selectable period of time, such as a 5 to 30 business days for retransmission of the formatted output if the customer supplied billing service 60 is temporarily unavailable or is being serviced.

While the invention has been illustrated and described in the preferred embodiments, many modifications and changes therein may be affected by those skilled in the art. It is to be understood that the invention is not limited to the precise construction herein disclosed. Accordingly, the right is reserved to all changes and modifications coming within the true spirit and scope of the invention.

We claim:

1. A billing system in an Advanced Intelligent Network (AIN) comprising at least one central office switching system, wherein a peripheral subsystem is connected to said central office switching systems via a call connection channel, said peripheral subsystem coupled to a third party billing system, said peripheral subsystem comprising means for providing at least one auxiliary call processing capability via said call connection channel; said a billing system comprising:

a billing generation means running on said peripheral subsystem for generating billing data related to said auxiliary call processing capability;

a collecting means for collecting said billing data;

formatting said billing data to a specified formatted output; and outputting said formatted output to said third party billing system via a Transmission Control Protocol/Internet Protocol (TCP/IP).

2. A billing system of claim 1, wherein said peripheral subsystem is an IBM MSP/6000 system.

3. The billing system of claim 1, wherein said outputting of said formatted output to said third party billing system includes parallel output of said data object to a local storage medium.

4. The billing system of claim 1, where in said formatting of said billing data is compatible with Bellcore Automatic Message Accounting format.

5. An intelligent peripheral billing system for an Advanced Intelligent Network (AIN) telephony control system with the public switched telephone network, said peripheral subsystem coupled to a third party billing system, wherein a peripheral subsystem consisting of a multi-processor system contains at least one call processor for controlling the switched routing of telephone calls through a central office switch said intelligent peripheral billing system comprising:

billing generator communicatively connected to said peripheral subsystem for generating billing data for said call processor;

a collecting means for collecting said billing data;

formatting said billing data to a specified output; and outputting said formatted output to said third party billing system via a transmission control protocol/Internet protocol.

6. An intelligent peripheral billing system of claim 5, wherein said intelligent peripheral subsystem is an IBM MSP/6000 system.

7. An intelligent peripheral billing system of claim 5, wherein said outputting of said formatted output to said to said third party billing system includes parallel output of said data object to a local storage medium.

8. An intelligent peripheral billing system of claim 5, wherein said formatting of said billing data is compatible with Bellcore Automatic Message Accounting format.

9. A billing system in an Advanced Intelligent Network (AIN) comprising at least one central office switching system, wherein a peripheral subsystem is connected to said central office switching systems via a call connection channel, said peripheral subsystem coupled to a third party billing system, said peripheral subsystem comprising means for providing at least one auxiliary call processing capability via said call connection channel; a method of billing comprising the steps of:

generating a billing data on said peripheral subsystem related to said auxiliary call processing capability;

collecting said billing data;

formatting said billing data to a specified formatted output; and outputting said formatted output to said third party billing system via a Transmission Control Protocol/Internet Protocol (TCP/IP).

10. A billing method of claim 9, wherein said peripheral subsystem is an IBM MSP/6000 system.

11. The billing method of claim 9, wherein said step of outputting of said formatted output to third party billing system includes parallel output of said data object to a local storage medium.

12. The billing method of claim 9, where in said step of formatting of said billing data is compatible with Bellcore Automatic Message Accounting format.

* * * * *